Patented Aug. 24, 1948

2,447,873

UNITED STATES PATENT OFFICE

2,447,873

PREPARATION OF ORGANOHALO-GENOSILANES

Eugene G. Rochow, Schenectady, N. Y., assignor to General Electric Company, a corporation of New York No Drawing. Application June 28, 1946, Serial No. 680,071

10 Claims. (Cl. 260—448.2)

This invention relates to the preparation of organohalogenosilanes. More particularly, the invention is concerned with a method for preparing hydrocarbon-substituted halogenosilanes containing hydrogen attached directly to the silicon atom, which method comprises effecting reaction between a hydrocarbon halide and the silicon component of a mass comprising silicon and a halide of copper, e. g., cuprous chloride.

The present invention is based on my discovery that organohalogenosilanes containing hydrogen attached directly to the silicon atom can be prepared in yields heretofore unobtainable by methods now employed in the art. Prior methods for preparing organohalogenosilanes include, for example, effecting reaction between a hydrocarbon halide and silicon, preferably in the presence of a catalyst, for instance, copper. This concept of using copper for effecting reaction between silicon and a hydrocarbon halide is disclosed and claimed in my U. S. Patent 2,380,995, issued August 7, 1945, and assigned to the same assignee as the present invention. The present invention differs from that claimed in the above-identified patent in that the organohalogenosilanes are produced by reaction of a hydrocarbon halide with the silicon component of a contact mass comprising silicon and a halide of copper.

When a hydrocarbon halide is caused to react with the silicon component of a mass comprising, for example, silicon and copper (as disclosed in the aforementioned patent), there is usually obtained in the reaction condensate only very small amounts of organohalogenosilanes containing a hydrogen attached directly to the silicon. For example, the amount of methyl dichlorosilane (CH₃SiHCl₂) obtained by means of this reaction is seldom more than 2 to 3 per cent, by weight of the weight of the liquid reaction products of methyl chloride and silicon.

Briefly described, my invention resides in the improved method of preparing organohalogenosilanes containing hydrogen attached directly to the silicon atom, more particularly, hydrocarbon-substituted halogenosilanes, for example, alkyl chlorosilanes, alkyl bromosilanes, etc., aryl chlorosilanes, aryl bromosilanes, etc., which method comprises effecting reaction between silicon and a hydrocarbon halide, for instance, an alkyl chloride, bromide, etc., an aryl chloride, bromide, etc., said reaction being effected in the presence of a halide of copper, for example, a cuprous halide or a cupric halide, for example, cuprous chloride, cupric chloride, cuprous bromide, cupric bromide, cuprous fluoride, cupric fluoride, etc. In a preferred embodiment of the invention, reaction is effected between the silicon and the hydrocarbon halide while the latter is in the vapor state and more particularly while the said components are intimately associated with the catalyst for the reaction, namely, the halide of copper.

The specific reactions involved and the compounds formed during the reaction between the hydrocarbon halide and silicon in the presence of the copper halide are not fully known or understood. When the mixture of silicon and copper halide powders is first heated, an exothermic reaction occurs whereby silicon tetrachloride is evolved. Apparently the silicon has reduced some of the copper halide to the free copper state with the liberation of silicon tetrachloride according to the equation, in the case of cuprous chloride: $Si + 4CuCl \rightarrow SiCl_4 + 4Cu$. However, this free reduced copper obtained in this reduction reaction has properties different from the copper ordinarily employed in effecting reaction between the hydrocarbon halide and silicon (see U. S. 2,380,995, supra). It seems that the free copper obtained by the reduction of the copper halide is of a more reactive type and causes a different reaction to take place than is obtained with ordinary copper powder. This is evidenced by the fact that the amount of organohalogenosilanes containing a hydrogen attached directly to the silicon atom obtained in the former case is anywhere from about 5 to 10 or more times that obtained using ordinary ground copper powder. It is, of course, to be understood that not all the copper halide is reduced by the silicon and that the remaining copper halide probably exerts an additional catalytic effect of its own.

The hydrocarbon halide used in the preparation of the organohalogenosilanes in accordance with the present invention, are alkyl-, aryl-, aralkyl- and alkaryl-halides, particularly the chlorides and bromides. Any of these compounds when brought into intimate contact with the heated contact mass comprising the silicon and the copper halide react at least partially with the silicon component thereof to form a mixture comprising the corresponding hydrocarbon-substituted halogenosilanes including the hydrocarbon-substituted halogenosilanes containing hydrogen attached directly to the silicon.

The contact masses consisting essentially of mixtures of silicon and the copper halide are ordinarily prepared by thoroughly mixing the two powdered components in suitable proportions. The resultant powders may be used as such or may be pressed into pellets or granules of suitable size and shape depending on the design of the reactor in which they are to be used. The pelleted or granular masses sometimes are preferred in reactors where less resistance to the passage of the hydrocarbon halides is particularly desirable.

In order that those skilled in the art may better understand how the present invention may be practiced, the following examples are given by way of illustration and not by way of limitation. All parts are by weight.

Example 1

About 85 parts of silicon powder and approximately 15 parts powdered cuprous chloride (CuCl or $Cu_2Cl_2$) were thoroughly mixed together and the mixture of powders pressed into the shape of a disk. This disk was broken into small pieces and packed into a glass reaction tube about one inch in diameter. The tube was heated to a temperature of about 275 to 300° C. at which time a reaction took place between the silicon and the cuprous chloride to yield some silicon tetrachloride as a result of the reduction of part of the cuprous chloride. Methyl chloride was passed over the silicon-cuprous chloride contact mass and the liquid reaction products were hydrolyzed. The hydrolyzate had an odor and properties quite different from those obtained by passing methyl chloride over a contact mass comprising a mixture of silicon and copper powders.

The passage of methyl chloride was continued thereafter over the silicon-cuprous chloride mass for about 90 hours at an average rate of approximately 3.8 parts methyl chloride per hour while the temperature of the tube was maintained at about 295° to 310° C. The effluent gases issuing at the exit end of the reaction tube were collected in several traps, namely, a water condenser trap and a trap cooled by solid carbon dioxide arranged in that order. The condensates from the two traps were removed and mixed together. The methyl chloride was separated from the mixture of condensates by evaporation at room temperature and distillation. The remainder of the condensate (about 153 parts) was then fractionally distilled to yield the following materials:

| Compound: | Per cent[1] |
|---|---|
| Methyl dichlorosilane ($CH_3SiHCl_2$) | 16.0 |
| Dimethyl dichlorosilane [$(CH_3)_2SiCl_2$] | 21.7 |
| Methyl trichlorosilane ($CH_3SiCl_3$) | 39.8 |
| Residue | 7.1 |
| Boiling below 66° C. (exclusive of methyl dichlorosilane) | 15.4 |

[1] Per cent by weight of the condensate free of methyl chloride.

Example 2

A glass reaction tube of the type employed in Example 1 was packed with small pieces of a silicon-cuprous chloride mass prepared in approximately the same manner as in the aforementioned example. When the tube was heated to about 265° C., a reaction took place between the silicon and the cuprous chloride to yield some silicon tetrachloride. Methyl chloride was passed through the tube for about 71 hours at an average rate of about 6.2 parts methyl chloride per hour. During this passage of the methyl chloride, the temperature was maintained at about 295 to 305° C. The effluent gases issuing at the exit end of the tube were collected in two traps arranged in the same manner as was used in Example 1. The condensates from each trap were mixed together and the mixture was distilled to remove the unreacted methyl chloride. The balance of the condensate (160.4 parts) was fractionally distilled to yield the following materials:

| Compound: | Per cent[2] |
|---|---|
| Methyl dichlorosilane ($CH_3SiHCl_2$) | 11.1 |
| Dimethyl dichlorosilane [$(CH_3)_2SiCl_2$] | 39.6 |
| Methyl trichlorosilane ($CH_3SiCl_3$) | 35.0 |
| Residue | 5.6 |
| Boiling below 66° C. (exclusive of methyl dichlorosilane) | 8.7 |

[2] Per cent by weight of the condensate free of methyl chloride.

When methyl chloride was passed over a contact mass comprising 10 per cent copper and 90 per cent silicon under conditions similar to the ones employed in the above two examples, the amount of methyl dichlorosilane obtained was less than 2 per cent.

It will be understood, of course, by those skilled in the art that my invention is not limited to the specific hydrocarbon halide named in the above illustrative examples and that any other hydrocarbon halides may be employed as reactants with the silicon, the conditions of reaction generally being varied, depending upon the particular starting hydrocarbon halide and the particular end products desired to be obtained.

Likewise, the invention is not limited to the specific reaction temperatures or temperature ranges mentioned in the examples. However, the reaction temperature should not be so high as to cause an excessive deposition of carbon upon the unreacted silicon during the reaction. In general, the reaction temperature to be used will vary with, for example, the particular hydrocarbon halide employed, the particular copper halide used and the yields of the specific reaction products desired to be obtained from a particular starting hydrocarbon halide. For example, by varying the temperature of reaction within the temperature range of, say 200° to 500° C., the proportions of the individual products obtained when the hydrocarbon halide is brought into contact with the contact mass (i. e., the contact mass comprising silicon and the copper halide) can be varied, and also, the over-all rate of reaction. At temperatures of about 200° C., the reaction proceeds much more slowly than at reaction temperatures around 250° to 400° C. At temperatures much above 400° C., in the case of methyl chloride, for example, there is a vigorous exothermic reaction which generally results in an undesirable deposition of carbon on the contact mass thereby lessening its efficiency.

The amount of copper halide present in the contact mass containing the silicon and the copper halide may also be varied. Ordinarily, the copper halide may comprise from 5 to 60 per cent of the total weight of the contact mass. I prefer to employ masses containing from 10 to 50 per cent, by weight, of the copper halide.

The present invention provides a new and improved method for the production of alkyl halogenosilanes (for example, methyl, ethyl, propyl, butyl, amyl, isoamyl, hexyl, etc., halogenosilanes), the aryl halogenosilanes (for example, phenyl halogenosilanes, etc.), the aryl-substituted aliphatic halogenosilanes (for example, phenylethyl halogenosilanes, etc.), and the aliphatic-substituted aryl halogenosilanes (for example, tolyl halogenosilanes, etc.). More particularly, the present invention provides a new and improved method for the production of alkyl halogenosilanes containing a hydrogen attached directly to the silicon atom (for example, methyl dichlorosilanes, ethyl dichlorosilanes, propyl dichlorosilanes, etc.), aryl halogenosilanes containing a hydrogen attached directly to the silicon atom (for example phenyl dihalogenosilanes, etc., for instance, from the reaction of a monohalogenated benzene, for example, monochlorobenzene, and silicon in the presence of the copper halide), aryl-substituted aliphatic halogenosilanes containing a hydrogen attached directly to the silicon atom (for example, phenylethyl dihalogenosilanes, etc.) and the aliphatic-substituted aryl halogenosilanes containing a hydrogen atom attaching directly to the silicon atom (for example, tolyl dihalogenosilanes, etc.).

The products of this invention have utility as intermediates in the preparation of other products. For instance, they may be employed as starting materials for the manufacturing of silicon resins. They are particularly useful as agents for treating water-non-repellent bodies to make them water-repellent in the manner disclosed and claimed in Patnode U. S. Patent 2,306,222 assigned to the same assignee as the present invention. The organohalogenosilanes containing a hydrogen attached directly to the silicon atom are particularly useful as agents for inducing water-repellency as disclosed and claimed in Norton U. S. Patent 2,386,259, also assigned to the same assignee as the present invention.

What I claim as new and desire to secure by Letters Patent of the United States is:

1. The method of preparing organohalogenosilanes containing a hydrogen attached directly to the silicon atom which method comprises effecting reaction at a temperature of from 200° to 500° C. between a hydrocarbon halide in the vapor state and the silicon component of a mass comprising silicon and a preformed halide of copper.

2. The method of preparing hydrocarbon-substituted halogenosilanes containing a hydrogen attached directly to the silicon atom which comprises effecting reaction at a temperature of from 200° to 500° C. between a hydrocarbon halide and the silicon component of a mass comprising silicon and preformed cuprous chloride.

3. The method of preparing hydrocarbon-substituted halogenosilanes containing a hydrogen attached directly to the silicon atom which comprises effecting reaction at a temperature of from 200° to 500° C. between a hydrocarbon halide and the silicon component of a mass comprising silicon and preformed cupric chloride.

4. The method of preparing alkyl-substituted halogenosilanes containing a hydrogen attached directly to the silicon atom which comprises effecting reaction at a temperature of from 200° to 500° C. between an alkyl halide in the vapor state and the silicon component of a mass comprising silicon and preformed cuprous chloride.

5. The method of preparing aryl-substituted halogenosilanes containing a hydrogen attached directly to the silicon atom which comprises effecting reaction at a temperature of from 200° to 500° C. between an aryl halide in the vapor state and the silicon component of a mass comprising silicon and preformed cuprous chloride.

6. The method of preparing methyl dichlorosilane which comprises effecting reaction at a temperature of from 200° to 500° C. between methyl chloride and the silicon component of a mass comprising silicon and a preformed halide of copper.

7. The method of preparing phenyl dichlorosilane which comprises effecting reaction at a temperature of from 200° to 500° C. between monochlorobenzene and the silicon component of a mass comprising silicon and a preformed halide of copper.

8. The method as in claim 7 wherein the halide of copper is preformed cuprous chloride.

9. The method of preparing methyl dichlorosilane which comprises effecting reaction at a temperature of from about 250 to 400° C. between methyl chloride in the vapor state and the silicon component of a contact mass comprising silicon and preformed cuprous chloride.

10. The method of preparing methyl dichlorosilane which comprises effecting reaction at a temperature of from 250° to 400° C. between methyl chloride and the silicon component of a contact mass comprising silicon and performed cuprous chloride, the cuprous chloride being present, by weight, in an amount equal to from about 5 to 50 per cent of the total weight of the contact mass.

EUGENE G. ROCHOW.

REFERENCES CITED

The following references are of record in the file of this patent:

UNITED STATES PATENTS

| Number | Name | Date |
|---|---|---|
| 2,380,995 | Rochow | Aug. 7, 1945 |
| 2,383,818 | Rochow et al. | Aug. 28, 1945 |
| 2,389,931 | Reed et al. | Nov. 27, 1945 |

OTHER REFERENCES

Hurd et al., Jour. Amer. Chem. Soc., vol. 67, pages 1057–1059, (1945).